United States Patent [19]

Johansson et al.

[11] Patent Number: 4,882,506

[45] Date of Patent: Nov. 21, 1989

[54] LOW VOLTAGE AND LOW POWER DETECTOR CIRCUITS

[75] Inventors: Jan H. Johansson, Balsta, Sweden; Erik K. Lunderius, San Jose, Calif.

[73] Assignee: Advanced Micro Devices, Inc., Sunnyvale, Calif.

[21] Appl. No.: 908,536

[22] Filed: Sep. 17, 1986

[51] Int. Cl.[4] .................. H03K 3/01; H03K 19/086; H03K 19/092; G06G 7/12

[52] U.S. Cl. .................. 307/296.1; 307/296.3; 307/296.4; 307/296.6; 307/494; 307/455; 307/467; 307/475; 307/362; 307/360; 375/71

[58] Field of Search ................... 307/296 R, 494, 455, 307/467, 475, 360, 362; 375/71

[56] References Cited

U.S. PATENT DOCUMENTS 4,709,202 11/1987 Koenck et al. .................. 320/39
4,716,354 12/1987 Hacker .................. 323/303

Primary Examiner—Stanley D. Miller
Assistant Examiner—Trong Quang Phan
Attorney, Agent, or Firm—Davis Chin

[57] ABSTRACT

Low voltage and low power circuits for use in a subscriber power controller includes a low voltage detection circuit for generating a first output signal switching between ECL logic levels and a low power detection circuit for generating a second output signal switching between a high voltage level and a low voltage level. The low voltage detection circuit is formed of a first comparator with hysteresis and a first output stage. The low power detection circuit is formed of a second comparator with hysteresis and a second output stage. The first output signal is used to disable the controller upon detection of a low voltage at the primary input signal voltage. The second output signal is used to inform a microprocessor so as to permit it to disable all high power functions in order to conserve power.

15 Claims, 4 Drawing Sheets

LOW VOLTAGE AND LOW POWER DETECTOR CIRCUITS

BACKGROUND OF THE INVENTION

This invention relates generally to detection circuits and more particularly, it relates to low voltage and low power detection circuits for use in a subscriber power controller integrated circuit which permits communication across the S interface of the Integrated Services Digital Network (ISDN).

In the field of telecommunications, use of digital signalling techniques in transmitting information over long distances is gaining more and more prominence for a wide range of communication, including voice, computer data and video data. Typically, the S or subscriber lines interface as referred to by the Consultative Committee for International Telegraphy and Telephony (CCITT) is used to interconnect ISDN terminal equipment to one or more network terminators such as private branch exchanges (PBX). A subscriber power controller (SPC) is used to convert the 40 volts delivered at the S interface into a stable, regulated 5 volt power supply for integrated circuits in the ISDN terminal equipment such as a telephone or data generating equipment. Such a power controller is manufactured and sold by Advanced Micro Devices, Inc., Sunnyvale, California, under part No. Am37936. The subscriber power controller is an integrated circuit formed of a single-chip package. As a part of the subscriber power controller integrated circuit, there are provided circuits which function to detect and to protect against certain faults most likely to occur at the S interface. In particular, the subscriber power controller is safeguarded against a low input voltage and a low input power.

The low voltage and low power detection circuits of the present invention is provided as a part of the subscriber power controller integrated circuit for performing such fault detecting functions. When the primary input supply voltage drops below a certain preset value, the subscriber power controller is disabled so as to prevent the supply line from being loaded down to an unacceptable low voltage level. Further, when the primary input supply voltage drops below a certain level a microprocessor is informed that the input power is low so as to permit disconnecting of all high power functions in order to conserve power.

SUMMARY OF THE INVENTION

In a preferred embodiment, low voltage and low power circuits of the present invention are provided for use in a subscriber power controller which includes a low voltage detection circuit for generating a first output signal switching between ECL logic levels and a low power detection circuit for generating a second output signal switching between a high voltage level and a low voltage level. The low voltage detection circuit is formed of a first comparator with hysteresis and a first output stage. The first comparator compares a low voltage detection signal corresponding to a portion of a primary input supply voltage with an internal reference voltage to produce a first detected signal. The first output stage is responsive to the first detected signal to produce the first output signal.

The low power detection circuit is formed of a second comparator with hysteresis and a second output stage. The second comparator compares a lower power detection signal corresponding to a portion of the primary input supply voltage with the internal reference voltage to produce a second detected signal. The second output stage is responsive to the second detected signal to produce the second output signal.

BRIEF DESCRIPTION OF THE DRAWINGS

The present invention will be better understood from the following detailed description when read in conjunction with the accompanying drawings with like reference numerals indicating corresponding parts throughout, wherein.

DESCRIPTION OF THE PREFERRED EMBODIMENT

Figure 1:
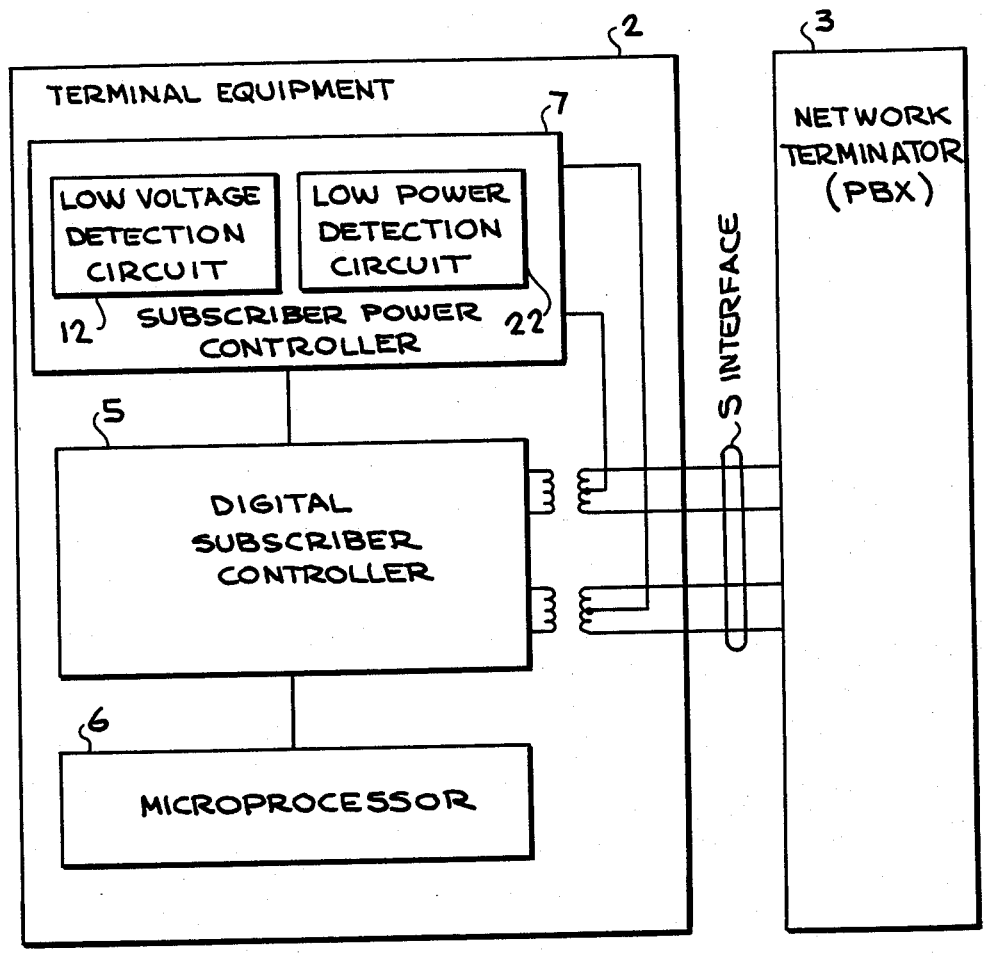
FIG. 1 is an overall block diagram of an integrated services digital network for communication across the S interface in accordance with the present invention.

Referring now in detail to the drawings, there is shown in FIG. 1 an overall block diagram of an integrated services digital network (ISDN) for communication across the S or subscriber interface which connects terminal equipment 2 to a network terminator 3 such as a private branch exchange (PBX). The terminal equipment 2 includes a digital subscriber controller 5, a microprocessor 6, and a subscriber power controller 7. As previously explained, the subscriber power controller is an integrated circuit which converts the 40 volts delivered at the S interface into a stable, regulated 5 volt power supply for other chips in the ISDN terminal equipment.

Figure 2:
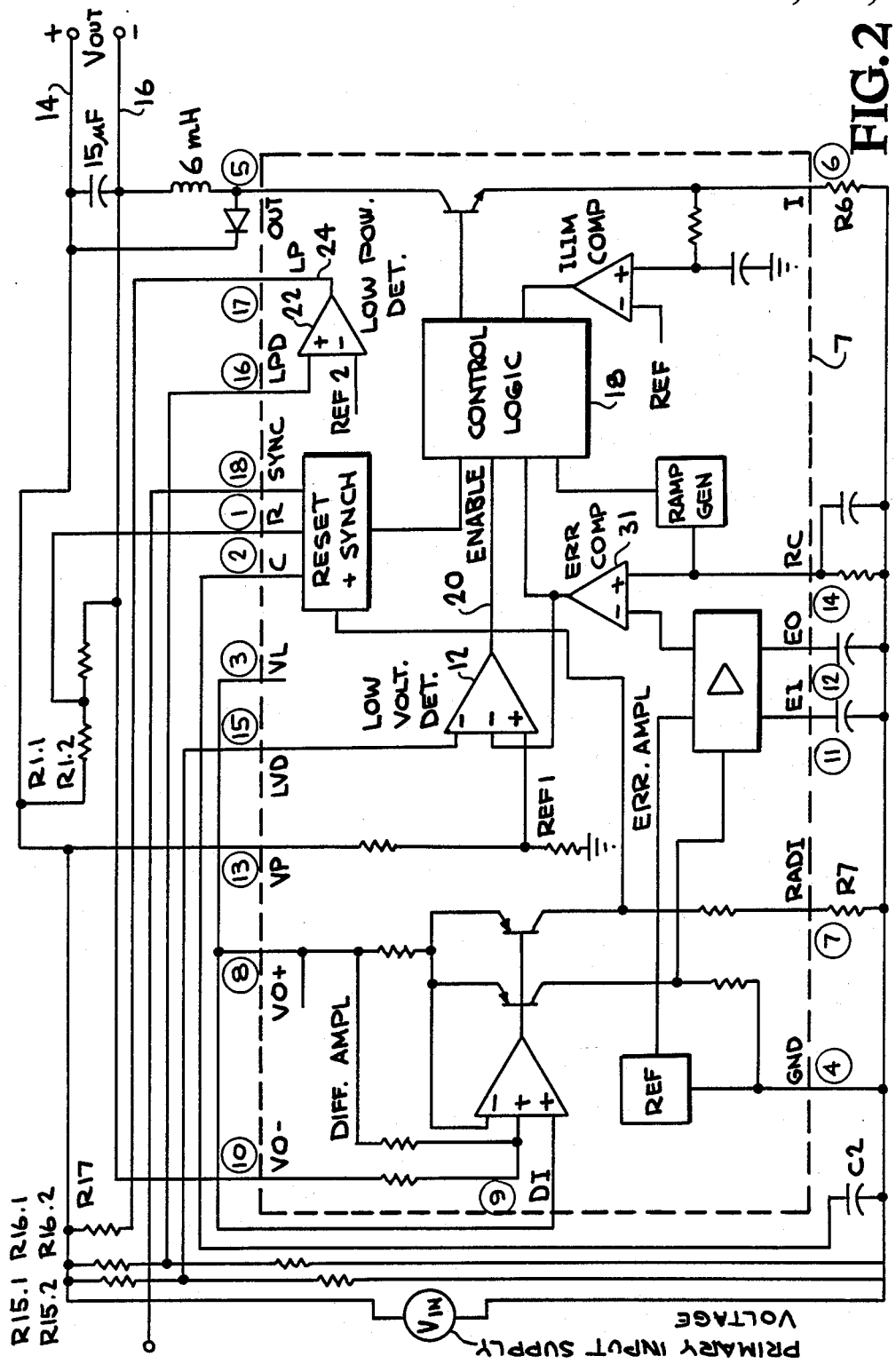
FIG. 2 is a more detailed block diagram of the subscriber power controller block in FIG. 1.

As can be seen from FIG. 2, a more detailed block diagram of the subscriber power controller 7 is illustrated. Such a controller is the Am7936 subscriber power controller manufactured by Advanced Micro Devices, Inc. of Sunnyvale, California. The controller 7 includes a low voltage detection circuit 12 of the present invention which senses a portion of the primary input supply voltage VIN and compares it with a reference voltage REF1. When the sensed or detected voltage drops below the reference voltage REF1, the subscriber power controller 7 is disabled, thereby preventing the supply lines 14, 16, from being loaded down to an unacceptable low voltage level. The subscriber power controller is disabled by a control logic block 18 which receives as one of its input the output on line 20 from the low voltage detection circuit 12.

The controller 7 also includes a low power detection circuit 22 of the present invention which monitors the primary input supply voltage VIN and compares it with an internal reference voltage REF2. When the input voltage drops below the reference voltage REF2, a high voltage level appears on the line 24 at the output of the low power detection circuit 22, and is sent to the microprocessor 6 to indicate an emergency power condition so that all high power functions may be disabled or turned off so as to conserve power.

Figure 3:
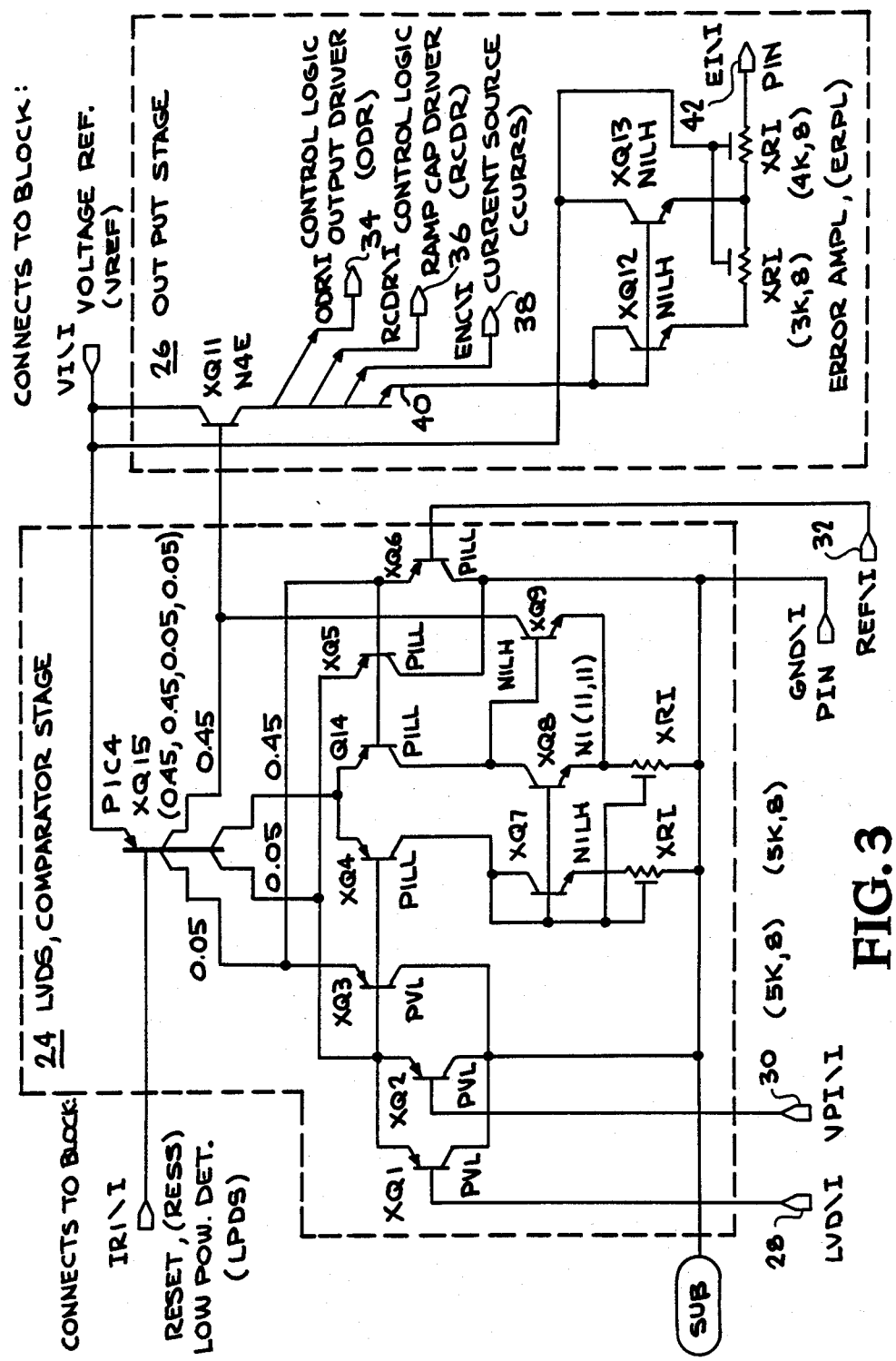
FIG. 3 is a detailed schematic circuit diagram of the low voltage detection circuit in the subscriber power controller of FIG. 2.

In FIG. 3, there is shown a detailed schematic circuit diagram of the low voltage detection circuit 12 formed of a comparator stage 24 with hysteresis and a logic output stage 26. The comparator stage 24 comprises a differential amplifier formed of a pair of transistors Q4 and Q14, a current source transistor Q15 to supply a bias current, a current mirror formed of transistors Q7 and Q8, and an output transistor Q9. The comparator 24 has a first inverting input terminal 28 which is connected to receive a low voltage detection signal for delivery to the base of the transistor Q1. The comparator 24 has a second inverting input terminal 30 which is connected to receive another input signal which may be used to set another voltage reference level.

The inverting input terminal 32 of the comparator 24 is connected to receive a reference voltage REF1 which is applied to the base of the transistor Q6. The output of the comparator 24 is taken from the collector of the output transistor Q9.

Normally, the differential voltage VDIFF1 across the first inverting input terminal 28 and the non-inverting terminal 32 will be at a negative potential. This causes the the transistors Q1 and Q3 to be turned off and causes the transistors Q6 and Q14 to be turned off. As a result, the output transistor Q9 will be turned off rendering its collector to be at a high voltage level. As the differential voltage VDIFF increases and becomes positive corresponding to a detected low voltage signal, the transistors Q1 and Q3 will become non-conductive and the transistors Q6 and Q14 will be turned on so as to supply current to the base of the output transistor Q9. Thus, the transistor Q9 will be saturated and the output of the comparator 24 at the collector of the transistor Q9 will be at a low voltage level representing the detection of a low voltage from the primary input supply voltage VIN.

The logic output stage 26 comprises a multi-emitter transistor Q11 and emitter follower transistors Q12 and Q13. The input of the logic output stage 26 is at the base of the transistor Q11 which is connected to the output of the comparator 24 at the collector of transistor Q9. The emitters 34, 36 and 38 are the outputs of output stage 24 and operate at ECL logic levels. The emitter 40 provides a logic output which is connected to the bases of transistors Q12 and Q13 so as to provide an additional ECL logic output at the output terminal 42. In operation, when the input of the output stage 26 is at the low voltage level, the logic outputs at the emitters 34–40 will be at a low ECL logic level. When the input to the output stage 26 is at the high voltage level, the logic outputs at the emitters 34–36 will be at a high ECL logic level.

Figure 4:
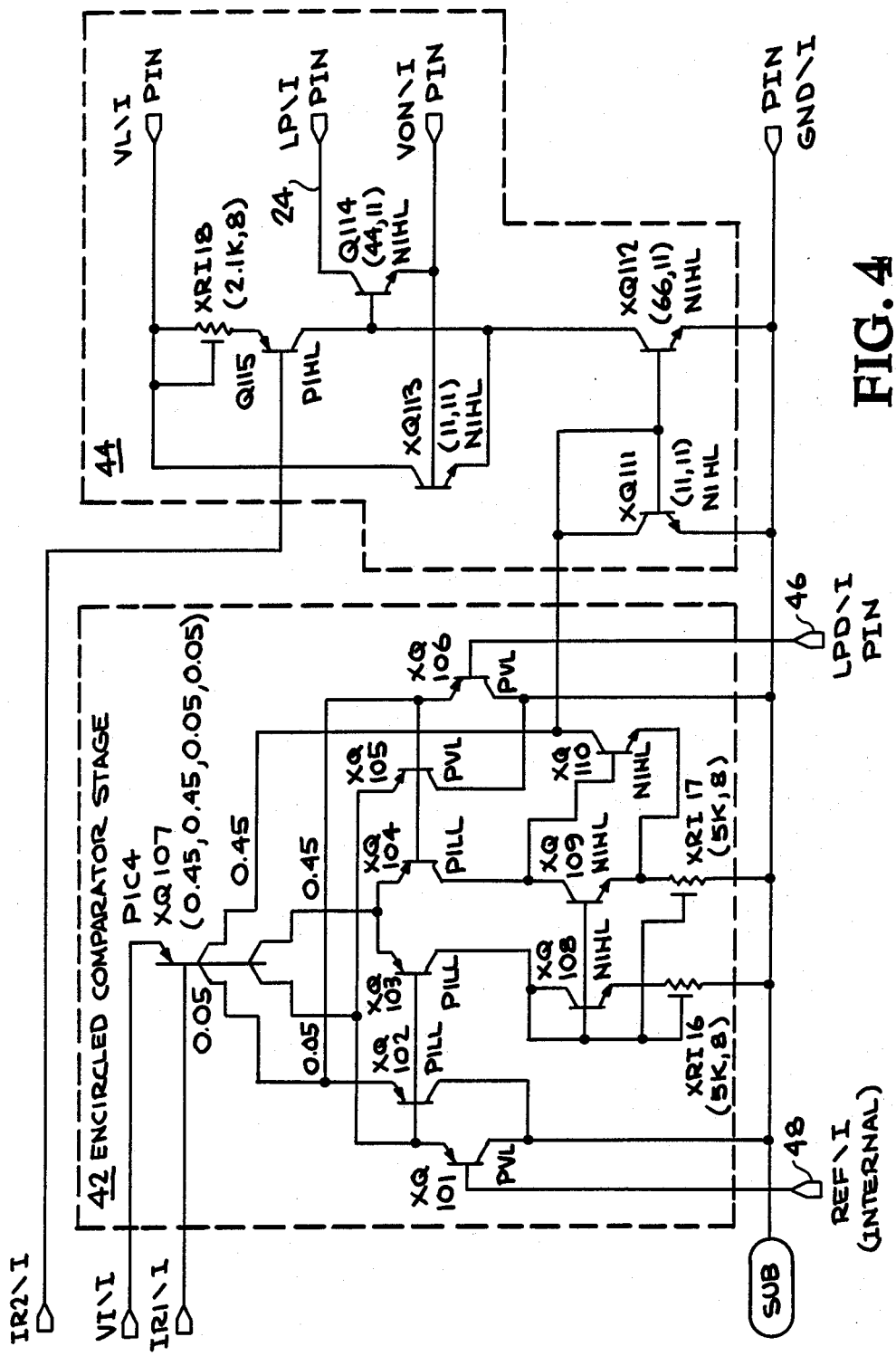
FIG. 4 is a detailed schematic circuit diagram of the low power detection circuit of the subscriber power controller of FIG. 2.

In FIG. 4, there is shown a detailed schematic circuit diagram of the low power detection circuit 22 formed of a comparator stage 42 with hysteresis and an output stage 44. The comparator stage 42 comprises a differential amplifier formed of a pair of transistors Q103 and Q104, a current source Q107 to supply a bias current, a current mirror formed of transistors Q108 and Q109, and an output transistor Q110. The comparator 42 has a non-inverting input terminal 46 which is connected to receive a low power detection signal for delivery to the base of the transistor Q106. The comparator has an inverting input terminal 48 which is connected to receive a reference voltage REF2 for delivery to the base of the transistor Q101. The output of the comparator 42 is taken from the collector of the transistor Q110.

Normally, the differential voltage VDIFF2, across the inverting terminal 48 and the non-inverting input terminal 46 will be at a negative voltage potential. This causes the transistors Q101–Q103 to be turned on and the transistors Q104–Q106 to be turned off. As a result, the output transistor Q110 will be turned off rendering its collector to be at a high voltage level. As the differential voltage VDIFF2 increases and becomes positive indicating detection of a low power signal, the transistors Q101–Q103 will become non-conductive and the transistors Q104–Q106 will be turned on and supply current to the base of the output transistor Q110. Thus, the transistor Q110 will be saturated and the output at its collector will be at a low voltage level, representing the detected low power appearing at the primary input supply voltage VIN.

The output stage 44 comprises a current mirror formed of transistors Q111 and Q112, a transistor Q113, an output transistor Q114, and a current source transistor Q115. The input of the output stage 44 is at the junction of the base-collector of the transistor Q111 and the base of the transistor Q112 which is connected to the output of the comparator stage 42 at the collector of the transistor Q110. The output of the output stage 44 is taken from the collector of the transistor Q114.

In operation, when the input to the output stage 44 is at the normally low voltage level, the output at the collector of the transistor Q114 will be at a low voltage level which is approximately +35 volts. When the input to the stage 44 is at the high voltage level, the output at the collector of the transistor Q114 will be at a high voltage level which is approximately +40 volts.

From the foregoing detailed description, it can thus be seen that the present invention provides a low voltage and low power detection circuits for use in a subscriber power controller which includes a low voltage detection circuit for generating a first output signal switching between ECL logic levels and a low power detection circuit for generating a second output signal switching between a high voltage level and a low voltage level. The first output signal is used to disable the controller when the primary input voltage drops below a certain preset level. The second output signal has no influence on the controller but is used to inform a microprocessor that a low power has been detected on the primary input supply voltage so as to disable all high power functions in order to conserve power.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it in intended that this invention not be limited to the particular embodiment disclosed as th best mode contemplated for carrying out the invention, but that the invention will include all embodiments falling within the scope of the appended claims.

What is claimed is:

1. Low voltage and low power circuits for use in a subscriber power controller comprising:
   low voltage detection means for generating a first output signal switching between ECL logic levels;
   said low voltage detection means being formed of a first comparator means and a first output stage;
   said first comparator means being formed of a first comparator with hysteresis for comparing a low voltage detection signal proportional to a primary input supply voltage with a first internal reference voltage to produce a first detected signal;

said first output stage being responsive to said first detected signal to produce said first output signal;

low power detection means for generating a second output signal switching between a high voltage level and a low voltage level;

said power detection means being formed of a second comparator means and a second output stage;

said second comparator means being formed of a second comparator with hysteresis for comparing a low power detection signal proportional to the primary input supply voltage with the second internal reference voltage to produce a second detected signal; and said second output stage being responsive to said second detected signal to produce said second output signal.

2. Low voltage and low power circuits as claimed in claim 1, wherein when the low voltage detection signal is lower than the first internal reference voltage the first output signal is at a high ECL logic level.

3. Low voltage and low power circuits as claimed in claim 1, wherein when the low power detection signal is lower than the second internal reference voltage the second output signal is at the high voltage level.

4. Low voltage and low power circuits as claimed in claim 1, wherein said first comparator comprises a first differential amplifier formed of a pair of transistors having a first base connected to the low voltage detection signal and a second base connected to the first reference voltage.

5. Low voltage and low power circuits as claimed in claim 1, wherein said first output stage comprises a multi-emitter transistor having its base connected to the output of said first comparator, the first output signal being generated at the emitters of said multi-emitter transistor.

6. Low voltage and low power circuits as claimed in claim 5, wherein said second comparator comprises a second differential amplifier formed of a pair of transistors whose bases are connected to the low power detection signal and the second reference voltage.

7. Low voltage and low power circuits as claimed in claim 6, wherein said second output stage comprises a current mirror arrangement and an output transistor.

8. In a subscriber power controller device for converting a high voltage at a subscriber interface into a stable, regulated low voltage to be used by integrated circuits in an integrated services digital system terminal equipment, said controller device including low voltage detection means for detecting a low voltage in the primary input supply voltage so as to disable the controller and low power detection means for detecting a low power level in the primary input supply voltage so as to permit a microprocessor to disable all high power functions in order to conserve power, said low voltage and low power detection means comprising:

low voltage detection means for generating a first output signal switching between ECL logic levels;

said low voltage detection means being formed of a first comparator means and a first output stage;

said first comparator means being formed of a first comparator with hysteresis for comparing a low voltage detection signal proportional to a primary input supply voltage with a first internal reference voltage to produce a first detected signal;

said first output stage being responsive to said first detected signal to produce said first output signal;

low power detection means for generating a second output signal switching between a high voltage level and a low voltage level;

said power detection means being formed of a second comparator means and a second output stage;

said second comparator means being formed of a second comparator with hysteresis for comparing a low power detection signal proportional to the primary input supply voltage with the second internal reference voltage to produce a second detected signal; and said second output stage being responsive to said second detected signal to produce said second output signal.

9. In a subscriber power controller device as claimed in claim 8, wherein when the low voltage detection signal is lower than the first internal reference voltage the first output signal is at a high ECL logic level.

10. In a subscriber power controller device as claimed in claim 8, wherein when the low power detection signal is lower than the internal reference voltage the second output signal is at the high voltage level.

11. In a subscriber power controller device as claimed in claim 8, wherein said first comparator comprises a first differential amplifier formed of a pair of transistors having a first base connected to the low voltage detection signal and a second base connected to the first reference voltage.

12. In a subscriber power controller device as claimed in claim 11, wherein said first output stage comprises a multi-emitter transistor having its base connected to the output of said first comparator, the first output signal being generated at the emitters of said multi-emitter transistor.

13. In a subscriber power controller device as claimed in claim 12, wherein said second comparator comprises a second differential amplifier formed of a pair of transistors whose bases are connected to the low power detection signal and the second reference voltage.

14. In a subscriber power controller device as claimed in claim 11, wherein said second output stage comprises a current mirror arrangement and an output transistor.

15. A method of generating a first output signal representing detection of a low voltage in the primary input supply voltage and a second output signal representative of a low power in the primary input supply voltage for use in a subscriber power controller, said method comprising the steps of:

comparing a low voltage detection signal proportional to a primary input supply voltage with a first internal reference voltage to produce a first detected signal;

converting said first detected signal to produce the first output signal switching between ECL logic levels;

comparing a low power detection signal proportional to the primary input supply voltage with a second internal reference voltage to produce a second detected signal; and converting the second detected signal to produce the second output signal switching between a high voltage level and a low voltage level.

* * * * *